United States Patent [19]
Gaarder et al.

[11] Patent Number: 5,954,326
[45] Date of Patent: Sep. 21, 1999

[54] THREE STATE SHIFTING DEVICE FOR MULTI-FUNCTION OFFICE EQUIPMENT

[75] Inventors: Glenn W. Gaarder, Ramona; Thomas T. Frankie, Del Mar, both of Calif.

[73] Assignee: Hewlett-Packard Company, Palo Alto, Calif.

[21] Appl. No.: 08/971,012

[22] Filed: Nov. 14, 1997

[51] Int. Cl.⁶ ....................................... B65H 3/44
[52] U.S. Cl. ............... 271/9.02; 271/9.11; 271/9.13; 271/10.11; 358/498
[58] Field of Search ................... 271/9.02, 9.01, 271/9.04, 9.11, 9.12, 9.13, 10.11, 10.13; 400/185, 605; 358/498

[56] References Cited

U.S. PATENT DOCUMENTS

| | | | |
|---|---|---|---|
| 4,577,849 | 3/1986 | Watanabe | 271/10.13 |
| 4,770,555 | 9/1988 | Deschamps | 271/9.11 |
| 4,822,019 | 4/1989 | Nagira | 271/9.02 |
| 4,978,112 | 12/1990 | Yokoi | 271/9.02 |
| 5,169,250 | 12/1992 | Tsury et al. | 400/605 |
| 5,206,737 | 4/1993 | Sugiyama | 358/498 |
| 5,226,743 | 7/1993 | Jackson et al. | 400/625 |
| 5,391,009 | 2/1995 | Stodder | 400/605 |
| 5,587,812 | 12/1996 | Kasuya | 358/498 |
| 5,800,083 | 9/1998 | Gaarder et al. | 400/185 |
| 5,896,206 | 4/1999 | Kellogg | 358/498 |

FOREIGN PATENT DOCUMENTS

| | | | |
|---|---|---|---|
| 361124449 | 6/1986 | Japan | 271/9.11 |

*Primary Examiner*—H. Grant Skaggs

[57] ABSTRACT

A multi-function sheet handling system including an automatic document feeder (ADF) for automatically feeding sheets of a document held in an ADF input tray. An ADF pick roller selectively picks a sheet of the document and advances the picked sheet along an ADF path. The system includes an automatic sheet feeder (ASF) for automatically feeding sheets of a print media held in an ASF input tray. An ASF pick roller selectively picks a sheet from the ASF input tray and advances the picked sheet along an ASF path. The system further includes an ADF gear for driving the ADF roller, an ASF gear for driving the ASF roller, and a motor drive including a gear train, the motor drive including a stepper motor or other motor with position control. A three-state shifting device couples the motor drive gear train to the ADF and the ASF gears. The shifting device has a neutral state wherein neither the ADF gear nor the ASF gear is driven, an ADF state wherein only the ADF gear is driven, and an ASF state wherein only the ASF gear is driven. The shifting device includes a cam swing arm having a plurality of cam surfaces, and a ratcheting cam follower. The shifting device is shifted from one state to another by operation of the motor in a sequence of reverse and/or forward motor drive operations.

21 Claims, 12 Drawing Sheets

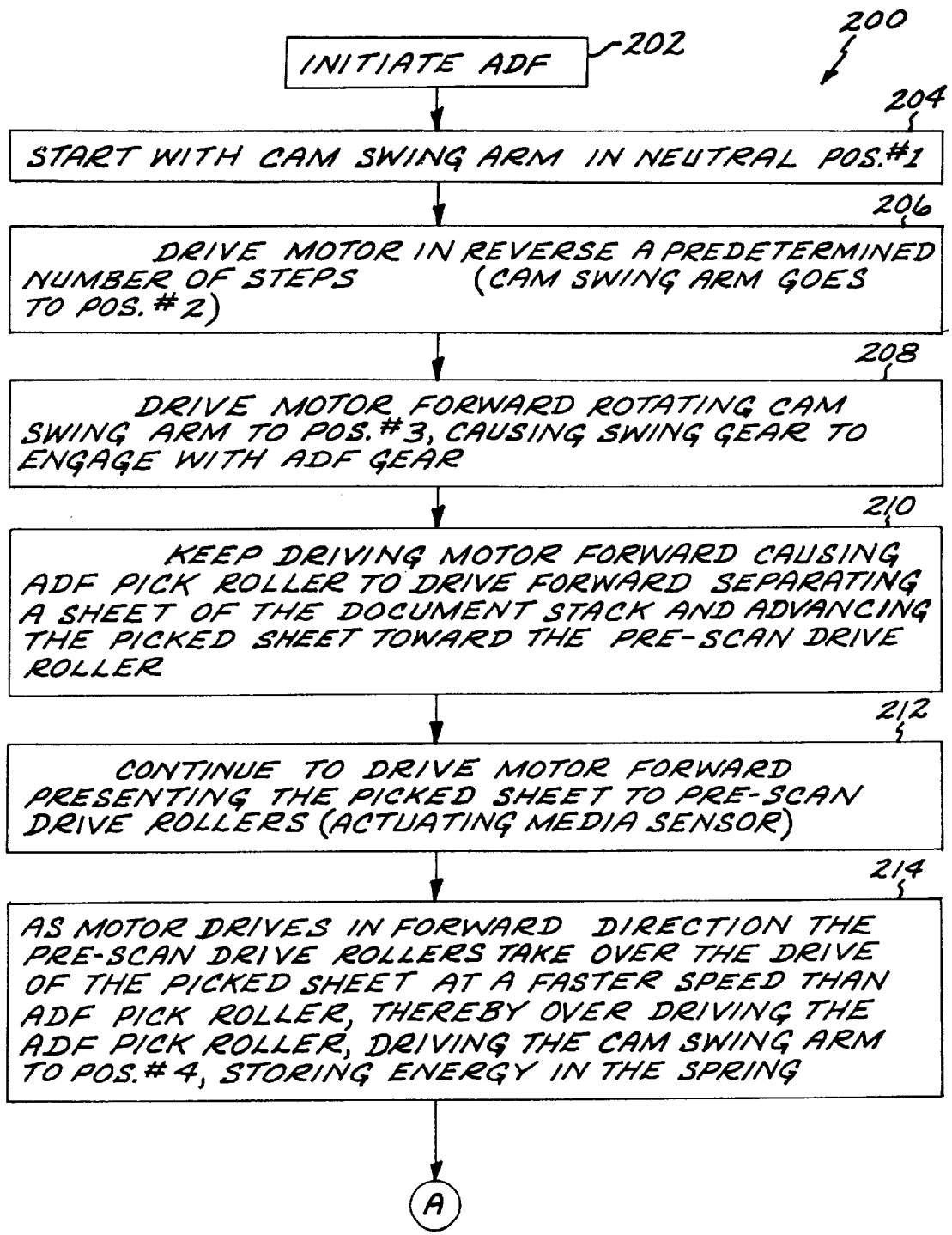
FIG. IIA

THREE STATE SHIFTING DEVICE FOR MULTI-FUNCTION OFFICE EQUIPMENT

TECHNICAL FIELD OF THE INVENTION

The present invention relates to a shifting device for shifting the input media drive for a multi-function office equipment between two input sources and a neutral position.

BACKGROUND OF THE INVENTION

Office equipment such as printers, scanners, copiers and facsimile machines are in universal use. Recently, new types of office equipment have been introduced, which combine functions of various machines into a single piece of equipment. These multi-purpose machines include, for example, the "OfficeJet" series of machines marketed by Hewlett-Packard Company, which includes functions of a printer and a facsimile machine. One characteristic of many of these multi-function machines is the use of two input media sources, with a drive to pick a sheet of media such as paper from one of the input sources and pass the picked sheet through a shared media path. For example, the machine may include an optical scanner and a printing apparatus, such as a scanning carriage holding an ink-jet print cartridge for example, disposed along a common media path through the machine. One input media source can be for holding documents to be scanned by the optical scanner, and the other media source can be for holding a supply of blank paper for printing. In one mode of operation, document sheets are sequentially fed from the first input source into the shared media path and past the scanning apparatus for optical scanning. In another mode of operation, blank sheets are fed from the second input source into the shared media path and to a printing area for printing by the printing apparatus. The drive apparatus can include a gear train for selectively driving apparatus to pick a sheet from one of the input sources.

One type of drive system employs a solenoid to determine which of three states the gear train will shift into. The first state is the state in which an input gear is engaged with a first gear which drives the automatic document feeder. The second state is the state in which the input gear is in a neutral position, and drives neither the first gear nor a second gear. The third state is the state in which the input gear is engaged with the second gear which drives the automatic sheet feeder. The input gear is mounted on a swing arm with a drag clutch. When the input gear is being driven backwards, the swing arm (motivated by the driving friction) swings back until it is in engagement with the first gear. The solenoid is attached to a lever, which, when the solenoid is not energized, is in a position such that when the input gear and associated drag from the drag clutch is driven forward, the swing arm is driven forward until it hits the lever. This position thus defines the neutral position where the drive gear is mated with neither the first or second drive gear. The solenoid is energized when the input gear is being driven forward, which removes the lever from the input gear swing arm's path, allowing the input gear to move fully into engagement with the second gear.

There are several problems with the solenoid selection of the state of the drive gear train. There is a force hierarchy that needs to exist for all operating conditions and consideration for age and wear of the mechanism. If the solenoid spring is not strong enough to overcome the drag force of the input gear swing arm, the swing arm will push the solenoid lever aside and engage with the second gear instead of remaining in a neutral state. If, on the other hand, the solenoid spring is too strong, the solenoid will not be able to overcome the spring and rotate the solenoid lever when it is intended to have the input gear swing arm engage with the second gear.

The solenoid is force limited due to cost, space and power requirements. A solenoid is a significant cost factor in a consumer product, particularly when considering the electronic drive components and additional power supply capacity need to drive the solenoid. Moreover, the manufacturing tolerances of solenoids result in radically different characteristics from solenoid to solenoid, particularly troubling when coupled with the force hierarchy requirements. Additional disadvantages of a solenoid include the heat generated by the solenoid.

It would therefore represent an advance in the art to provide a technique for providing a multistate switching technique for the input drive of an office machine which does not include a solenoid actuator.

SUMMARY OF THE INVENTION

A multi-function sheet handling system is described, and includes an automatic document feeder (ADF) for automatically feeding sheets of a document held in an ADF input tray, the ADF including an ADF pick roller for selectively picking a sheet of the document and advancing the picked sheet along an ADF path. The system includes an automatic sheet feeder (ASF) for automatically feeding sheets of a print media held in an ASF input tray, the ASF including an ASF pick roller for selectively picking a sheet from the ASF input tray and advancing the picked sheet along an ASF path. The system further includes an ADF gear for driving the ADF roller, an ASF gear for driving the ASF roller, and a motor drive including a gear train, the motor drive including a stepper motor or other motor with position control. In accordance with the invention, the system further includes a three-state shifting device coupling the motor drive gear train to the ADF and the ASF gears. The shifting device has a neutral state wherein neither the ADF gear nor the ASF gear is driven, an ADF state wherein only the ADF gear is driven, and an ASF state wherein only the ASF gear is driven. The shifting device includes a cam swing arm having a plurality of cam surfaces, and a ratcheting cam follower. The shifting device is shifted from one state to another by operation of the motor in a sequence of reverse and/or forward motor drive operations and without the use of a solenoid to actively drive said cam into one of the states.

BRIEF DESCRIPTION OF THE DRAWING

These and other features and advantages of the present invention will become more apparent from the following detailed description of an exemplary embodiment thereof, as illustrated in the accompanying drawings, in which:

FIGS. 11A and 11B are flow diagrams illustrating the operation of the office equipment of FIG. 1 during an automatic document feed operation.

DETAILED DESCRIPTION OF THE PREFERRED EMBODIMENT

Figure 1:
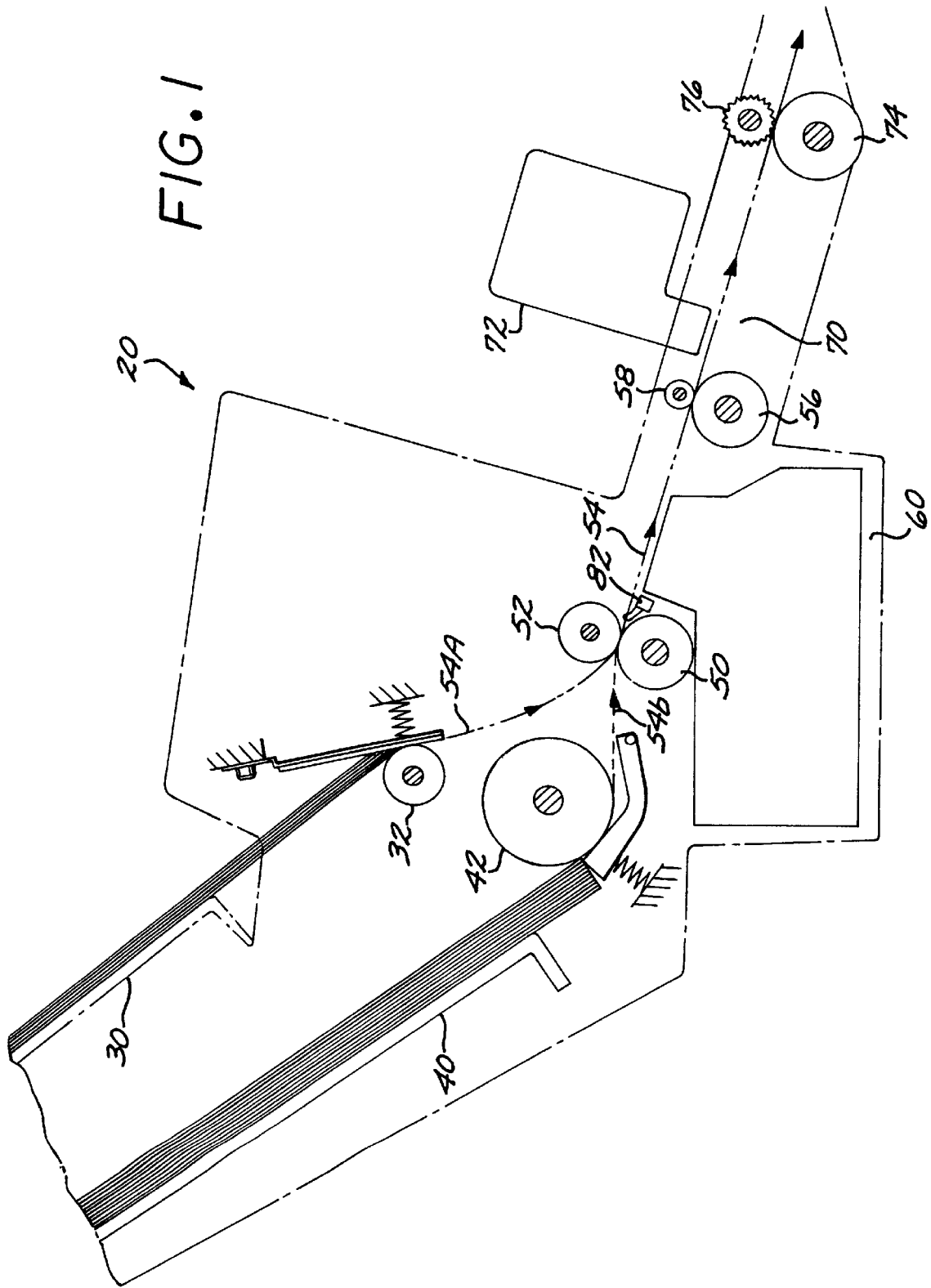
FIG. 1 is a simplified side view of the media path through a multi-function office equipment embodying this invention.

FIG. 1 is a simplified side view of an exemplary multi-function office equipment 20 employing this invention. This equipment can be, for example, a multi-function device of the type described in commonly assigned U.S. Pat. No. 5,391,009, or a device as described in co-pending application Ser. No. 08/724,297, filed Sep. 19, 1996, now U.S. Pat. No. / entitled MULTIPLE-FUNCTION PRINTER DOCUMENT DEFLECTOR ACTUATION COUPLED TO SERVICE STATION ACTUATION, e.g. at FIG. 13. This co-pending application and U.S. Pat. No. 5,391,009 are incorporated herein by this reference. The device 20 performs functions such as optically scanning imagery from a document picked from an automatic document feeder (ADF) 30 by ADF pick roller 32, or printing onto a sheet picked from an automatic sheet feeder (ASF) 40 by ASF pick roller 42. The device 20 can be a facsimile machine, or a multi-function office equipment such as a combination printer/scanner/facsimile machine. The picked document or sheet is fed through the nip between a pre-scan drive roller set 50 and idler roller set 52, tripping an edge sensor 82, and passed along a feed path 54 to the scanner station 60, through the nip between a main drive roller set 56 and idler roller set 58 to a printing station 70, wherein printing is performed via ink-jet cartridge 72, mounted on a traversing carriage (not shown) for movement transverse to the feed path. The sheet is then passed through the nip between a kick-out driver roller set 74 and star pinch roller set 76 to be ejected from the machine onto an output tray (not shown). This invention is concerned with the drive for picking and driving the document or sheet through the feed path.

While only one roller of each roller set 50, 52, 56, 58, 74 and 76 are visible in the side view of FIG. 1, it will be appreciated that in an exemplary embodiment, each set has two or more rollers. The roller sets 50, 56 and 74 are mounted on shafts in a spring-loaded relationship relative to respective pinch roller sets 52, 58 and 76, to provide gripping force on the sheet adjacent each longitudinal side of the sheet. The edge sensor 82 is mounted in the feed path after the pre-scan roller set 50, such that the sensor will be tripped after the leading edge has entered the nip between each pre-scan roller and its corresponding pinch roller, and is released after the trailing edge of the picked sheet passes.

Figure 2:
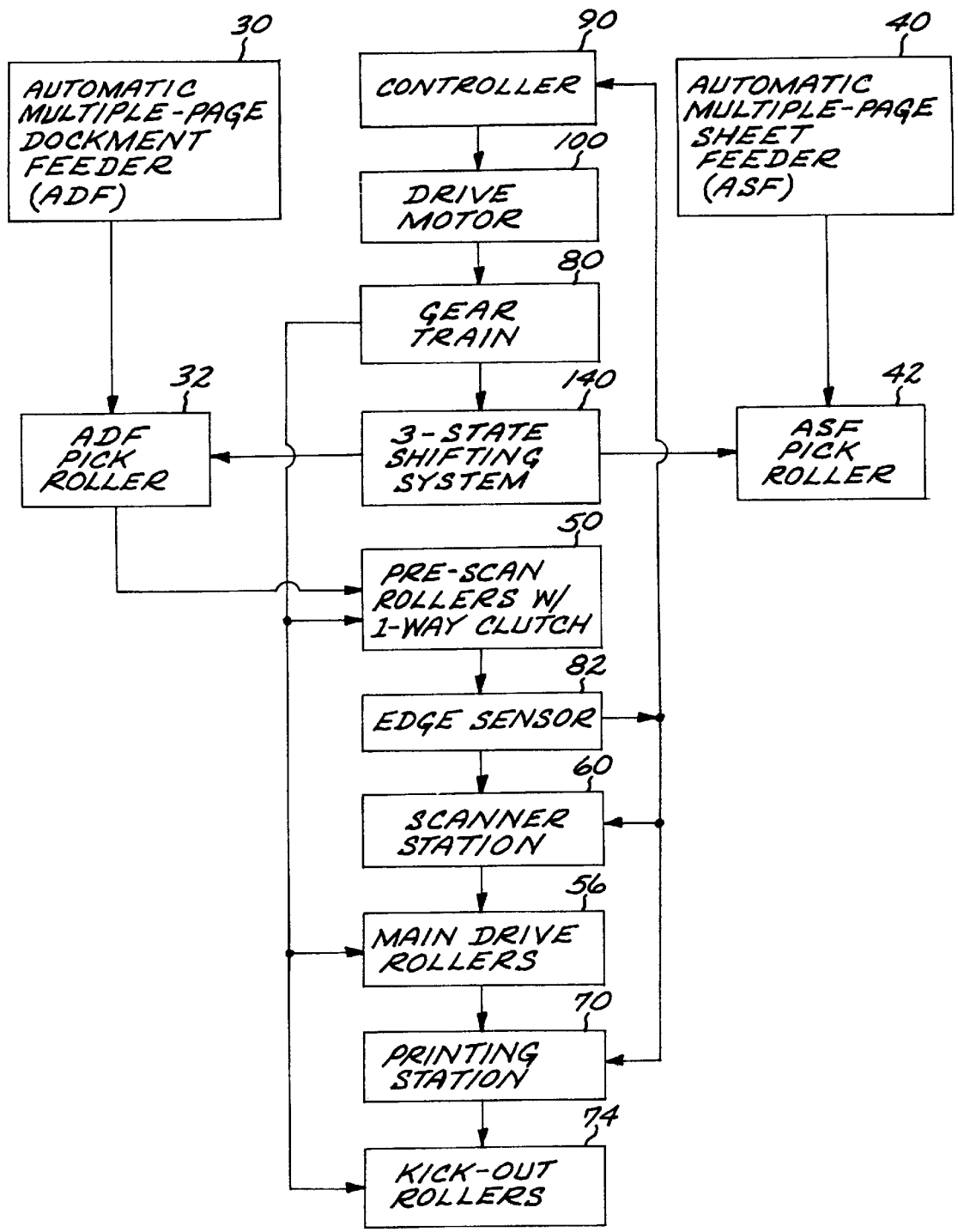
FIG. 2 is a diagrammatic block diagram illustrating the document feed system of the office equipment of FIG. 1.

FIG. 2 is a diagrammatic functional block diagram of elements of the machine of FIG. 1. As shown therein, the ADF 30 and the ASF 40 are separate feeders for feeding sheets of a document bearing some text or graphical information from respective document or sheet stacks, or blank sheets to be printed on. Respective pick rollers 32, 42 pick a sheet from the respective stack and pass the picked sheet along the respective path 54A, 54B into the pre-scan rollers 50. The pick rollers 32, 42 are selectively driven by a three-state shifting system 140 in accordance with the invention. The machine in this exemplary embodiment includes a stepper motor 100 which drives a gear train 80, which in turn drives the three-state shifting system 140, the pre-scan rollers 50, the main drive rollers 56 and the kick-out rollers 74. After the leading edge of the picked sheet is engaged by the pre-scan rollers 50, which are driven via a one-way clutch, an edge sensor 82 is tripped, sending a signal to the machine controller 90. The motor 100 is under the control of the machine controller 90, as are the scanner station 60 and printing station 70. Of course, the machine 20 will typically include other controlled elements, but these are not directly related to this invention, and are not shown in FIG. 2.

The motor 100 in this exemplary embodiment is a stepper motor, but other types of motors which provide position control could alternatively be employed, such as servo motors and motors with position encoders.

Figure 3:
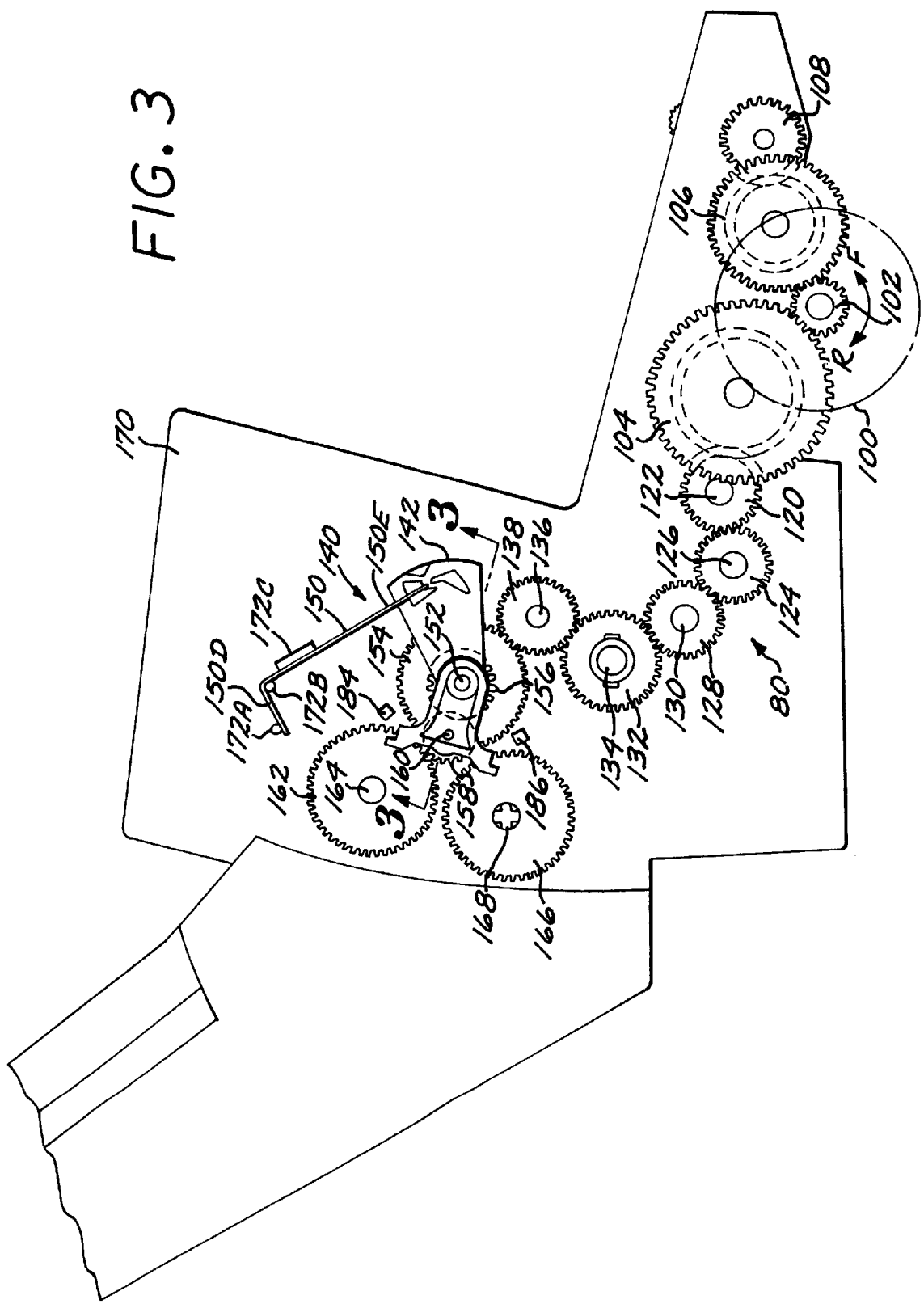
FIG. 3 is a side view illustrating the gear drive train of the media drive system of the office equipment of FIG. 1.

FIG. 3 is a simplified side view illustrating an exemplary gear drive train 80 and the three-state shifting system 140 in accordance with the invention. Various elements of the gear train are supported by axle projections from a side plate 170. Other elements of the gear train are supported on shafts carrying the pre-scan, main and kick-out rollers. A single stepper motor 100 is employed to pick a sheet from the proper input source and advance the sheet through the media path to the output tray. The motor is driven by motor command signals generated by the controller 90, and in this embodiment is an open-loop system, in that no encoder or other type of position feedback system is used to provide position or velocity feedback signals to the controller 90. The motor 100 preferably has sufficient torque that it does not lose its position as a result of motor operations.

The stepper motor 100 directly drives its motor gear 102 in either the forward (F) direction or the reverse (R) direction (FIG. 3). The motor gear 102 engages reduction gears 104 and 106. Reduction gear 104 drives gears on the input side of the printing station 70, and reduction gear 106 drives gear 108 on the output side of the printing station. The kick-out drive roller 74 is mounted on a shaft 168, and is driven by gear 108 also mounted on the shaft 168.

The main drive rollers 56 are mounted on shaft 122, and are driven by reduction gear 104, engaging gear 120 mounted on the shaft 122. The pre-scan rollers 50 are mounted on shaft 134, and are driven through a one-way clutch and gear 132 also mounted on this shaft 134. Gear 132 is driven via intermediate gears 124 and 128, mounted on respective axles 126, 130, by gear 120. Rotational energy is imparted to the pre-scan roller set 50 via the gear 132 and the one-way clutch when the motor 100 is driven in the forward direction. When the motor is driven in the reverse direction, the one-way clutch slips, and the pre-scan roller set 50 is not driven in the reverse direction. One-way clutches suitable for the purpose are well known in the art.

The ADF pick roller 32 is mounted for rotation on axle 164. The ASF pick roller 42 is mounted for rotation on axle 168.

A feature of the machine is that the gear/roller sizes are appropriately selected such that the pre-scan roller set 50 when driven in the forward motor direction drives the picked sheet at a faster rate than the rate at which the ADF roller advances the picked sheet. As a result of this speed differential, the ADF roller 32 will be over-driven once the picked sheet is engaged into the nips between the roller set 50 and pinch roller set 52, due to the frictional engagement of the picked sheet.

A three state shifting system 140 is installed between the pre-scan roller drive and the pick rollers 32 and 42 in accordance with this invention. The shifting system 140 includes a cam swing arm 142 mounted on an axle 152, a spring follower 150, an input gear 154 with integrally formed follower gear 156, swing gear 158, ADF gear 162 mounted on axle 164, and ASF gear 166 mounted on shaft 168. The shifting system 140 has three states, a neutral state wherein neither the ADF nor the ASF roller are being driven, an ADF state wherein the ADF roller is being driven, and an ASF state wherein the ASF roller is being driven. The system 140 performs these functions without the aid of a solenoid, by selectively driving the motor 100 in forward and reverse directions for a specified number of steps or specified distance. The spring follower 150 acts as a ratchet to prevent undesirable movement of the cam swing arm in a reverse direction, and stores energy to positively move the arm through an unstable area of the circumferential path around a cam island.

In accordance with an aspect of the invention, a ratcheting cam is formed on the cam swing arm 142. The spring follower 150 rides in a path on the cam surfaces and determines the three different states. The cam surfaces are defined by two islands, and the spring follower circumnavigates around the two islands, one for ADF, the other for ASF operation. The two islands act as cams in cooperation with the spring follower to allow the cam swing arm to stop at three different stable positions, neutral, the ADF position, and the ASF position. When the input gear 154 is being driven backwards, a drag clutch on the cam swing arm 142 drives the swing arm and the input gear in the direction of the ratchet and into engagement with the ASF gear 166, thereby powering the ASF pick roller 42. When the input gear 154 is being driven in the forward direction from either the neutral position or the ASF position, the drag clutch drives the cam swing arm 142 forward until the cam hits a hard stop surface, which thereafter ceases any further forward rotation of the cam swing arm. This hard stop cannot be overcome by increases in drag force due to age, wear, or manufacturing tolerances.

When the input gear 154 is driven backwards from the hard stop or the neutral position for a short distance, but not all the way to the ASF position, the follower 150 enters a gating area. If the rotation is then reversed in this gating area, the follower is detoured around the hard stop and the swing arm is then allowed to fully rotate forward to the ADF position. If the rotation is not reversed in the gating area the follower simply proceeds to the ASF position.

Figure 4:
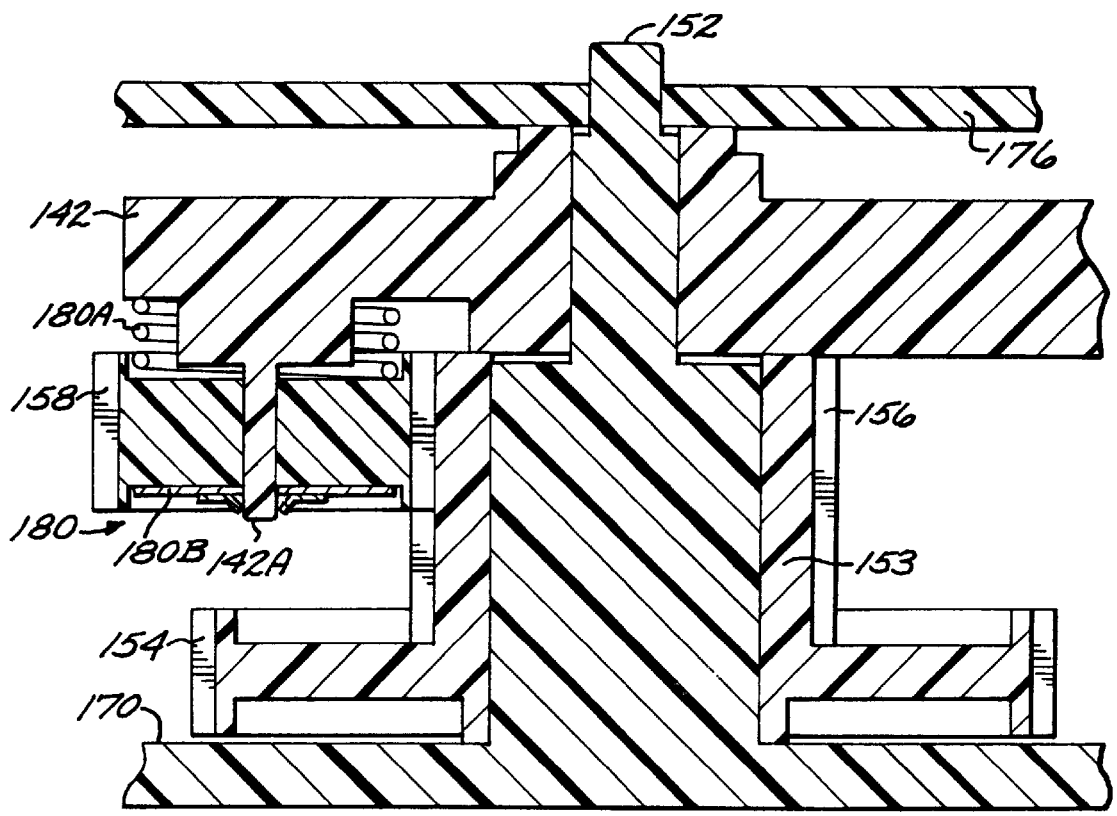
FIG. 4 is a cross-sectional side view taken through line 3—3 of FIG. 3, illustrating the drag clutch on the cam swing arm gear.

FIG. 4 is a cross-sectional view taken along line 3—3 of FIG. 3, and illustrates the drag clutch on the cam swing arm. The cam swing arm 142 is mounted on axle projection 152 extending from the side plate 170. The axle supports an input gear structure 153, which is a unitary structure rotating on the axle and defining the input gear 154 and follower gear 156. Teeth of the input gear 154 mesh with teeth of gear 138. Teeth of the follower gear 156 mesh with the teeth of the swing gear 158 mounted on the cam swing arm 142. As shown in FIG. 4, the cam swing arm 142 is mounted for rotation on axle 152, and includes a projecting swing arm axle 142A formed as an integral part of the swing arm.

The swing gear 158 is mounted to the axle by a drag clutch 180 comprising the compression spring 180A, and friction plate and fastener 180B. The clutch 180 provides a frictional drag tending to oppose free rotation of the swing gear 158 on the axle 142A, resulting from friction between surfaces of the gear 158 and clutch. The drag will tend to rotate the cam swing arm about the axle 152. The tip of axle 152 protrudes through a corresponding opening in a plastic cover 176. The drag clutch could alternatively be installed on the input gear.

The spring follower 150 is a length of stainless steel spring wire which is bent to engage several projections on the cover 176 which support the spring follower 150. The cover 176 is fabricated of a transparent plastic material in this embodiment. These projections are shown in FIG. 3 as pins 172A, 172B and projection 172C. A 90 degree bend is formed in the keeper end 150D of the spring 150, and holds the spring follower in place. The follower end 150E of the spring 150 has a 90 degree bend formed in it as well, but orthogonal to the plane of the housing plate 170. The follower end can bend in a clockwise direction about pin 172B, or in a counterclockwise direction about the end of the projection 172C. The stiffness of the spring element opposes the bending. The difference in free length of the spring in the two directions, due to the different fulcrum points of the pin 172B and projection 172C, results in different spring constants in the clockwise and counter-clockwise directions. The use of a transparent material in the fabrication of the cover 176 provides an inspection window, permitting a visual inspection of the spring follower after assembly, to ensure that the spring follower end is in the correct position, and has not been improperly installed due to manufacturing tolerances or assembly problems.

Figure 5:
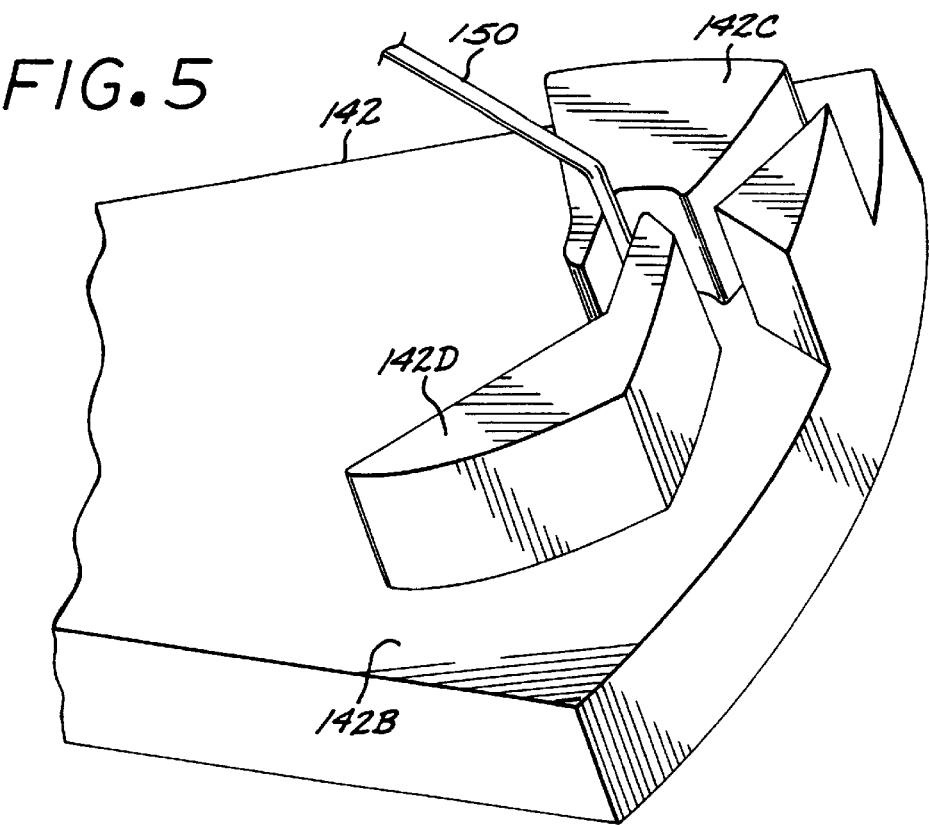
FIG. 5 is a broken away isometric view of a portion of the cam swing arm comprising the gear drive train of FIG. 3.
Figure 6:
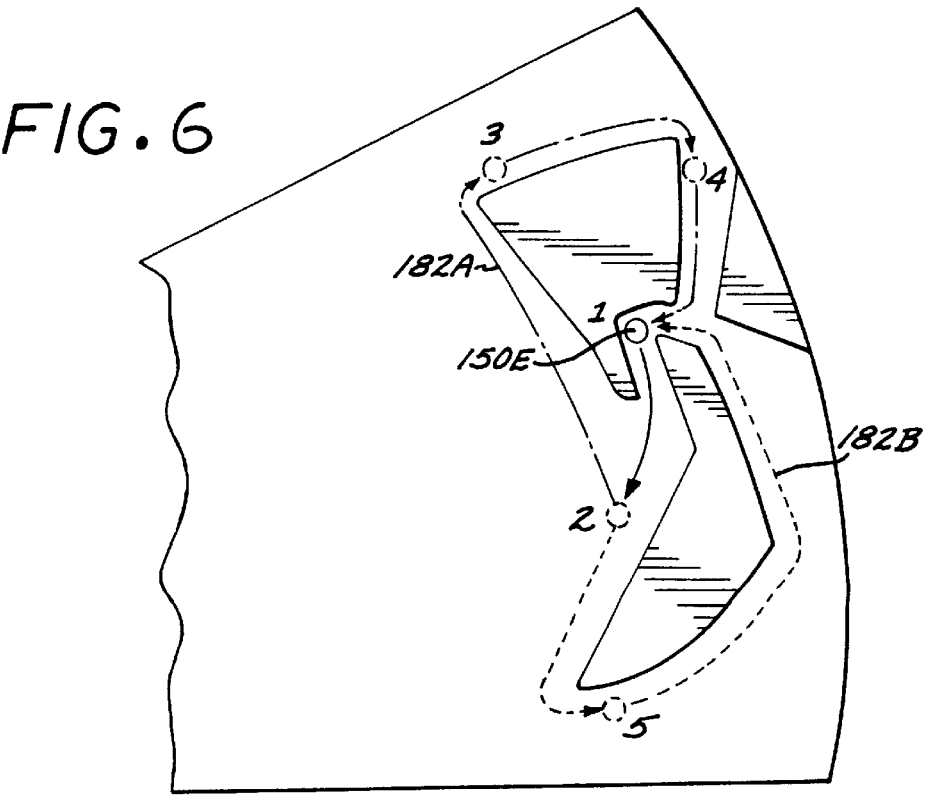
FIG. 6 is a side view of the cam swing arm, illustrating the travel of the cam swing arm in relation to a spring follower.

FIG. 5 illustrates the end 142B of the cam swing arm 142 which engages the follower end of the spring 150. The cam swing arm 142 pivots about the axle 152 through a range of motion determined by hard stops formed on the plate 170. The end 142B is opposite the end of the cam swing arm to which the swing gear 158 is attached. Protruding islands 142C and 142D are integrally formed on the arm 142, and define the path of travel of the follower end of the spring 150. The path 182 has two parts. The first path 182A is shown in FIG. 6, with the follower end 150E of the spring 150 at position 1. Position 1 is the neutral position; with the arm 142 in this position relative to the spring end 150E, neither ADF gear 162 nor ASF gear 166 is engaged by the swing gear 158. By appropriate rotation of the input gear 154 as described more fully below, the arm 142 can be driven to drive the ADF gear 162 so that the spring follower follows path 182A, from position 1 to position 2 to position 3, to position 4, and returning to the neutral position. Similarly, by appropriate rotation of the input gear 154, the cam swing arm 142 can be driven to drive the ASF roller, with the spring follower end 150E moving along path 182B, i.e. from position 1 to position 2 to position 5 and back to position 1. A third cam island serves to prevent the cam follower from making an illegal jump, e.g. moving from position 5 to position 4 to position 3.

Figure 7:
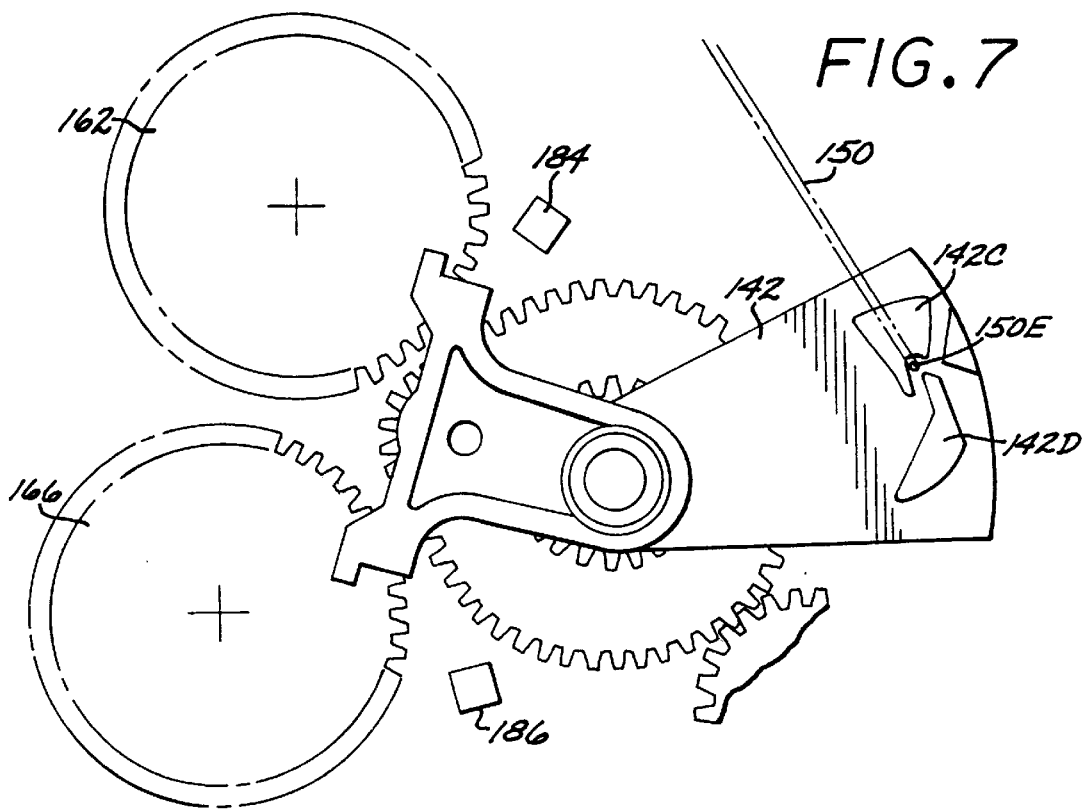
FIG. 7 is a close-up side view of the cam swing arm and gear, the ADF drive gear and the ASF drive gear, with the cam swing arm in the neutral gear.

The different positions of the swing gear 158 and the spring follower 150 in relation to the cam islands 142C and 142D are illustrated in FIGS. 7–10. FIG. 7 illustrates the cam swing arm 142 and spring follower 150 in the neutral position 1 (FIG. 6). Here, the swing gear 158 is not in engagement with either the ADF gear 162 or the ASF gear 166, and so neither the ADF nor the ASF roller is being driven. This position is a stable one, when input gear 154 is driven forward, with the spring follower 150 acting as a ratchet to hold the cam swing arm in position.

Figure 8:
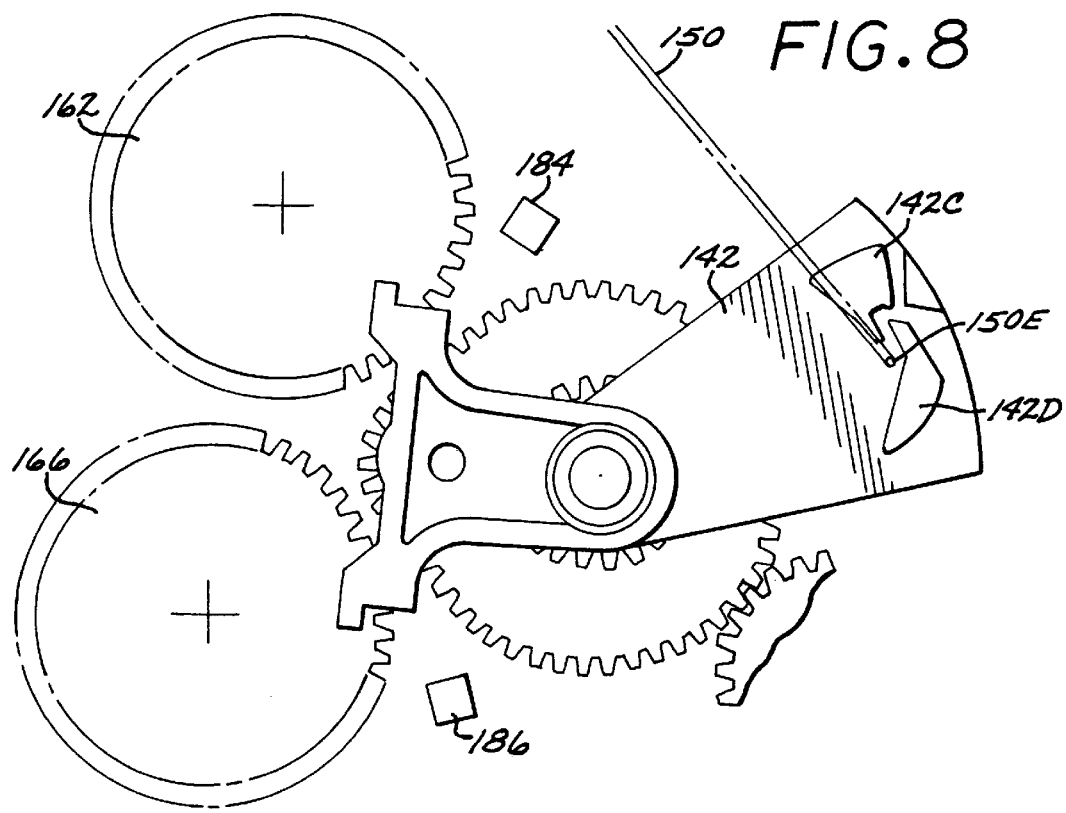
FIG. 8 is a view similar to FIG. 7, but showing the cam swing arm in a motor drive direction changing position along its path toward engagement of the cam swing arm gear with the ADF drive gear.
Figure 9:
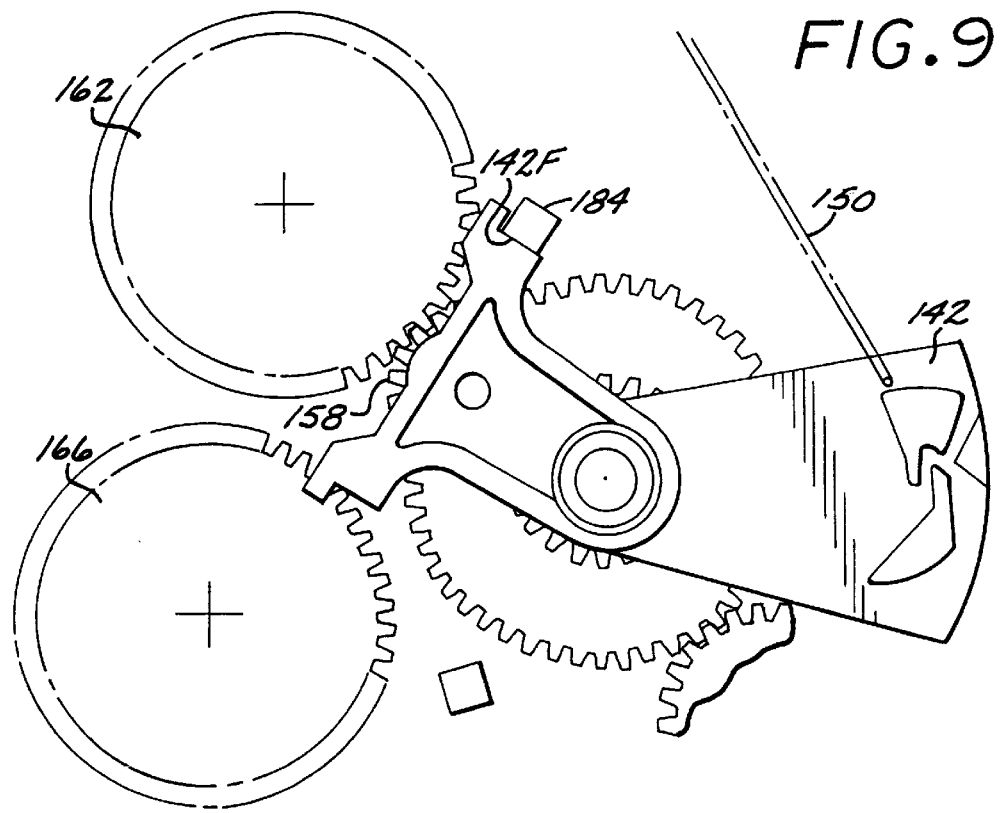
FIG. 9 is a view similar to FIG. 8, but showing the cam swing arm gear in engagement with the ADF drive gear.

FIG. 8 illustrates the case wherein the motor 100 has been driven in the reverse direction by a predetermined number of motor steps to move the cam swing arm 142 so that the spring follower 150 is now in position 2 (FIG. 6) relative to the cam islands. FIG. 9 illustrates the case wherein the motor 100 has now been driven in the forward direction, moving the cam swing arm 142 so that the spring follower 150 is at position 3 (FIG. 6). Now the swing gear 158 is engaged with the ADF gear 162, and the cam swing arm shoulder surface 142F has come into contact with hard stop 184 extending from the plate 170. The hard stop 184 prevents the cam swing arm 142 from moving too far, preventing the swing gear 158 from becoming too tightly meshed with the ADF gear 162 and thereby preventing excessive tooth contact force, leading to excessive friction, jamming and tooth wear. With the ADF roller 32 driven by the swing gear, a sheet of the document will be picked from the ADF 30, and advanced along the path 54A between the roller 32 and pre-scan roller 50. After the leading edge of the picked sheet enters the nip between the pre-scan roller 50 and idler roller 52, the function of advancement of the picked sheet is taken over by the roller 50, which advances the sheet slightly faster than the advancement rate of the ADF roller 32. Since the picked sheet is still in contact with the ADF roller 32, the roller 32 is overdriven by the picked sheet, which causes the cam arm 142 and spring follower 150 to move to position 1 (FIG. 6), i.e. the neutral position, with the ADF roller no longer being driven by the swing gear 158.

Figure 10:
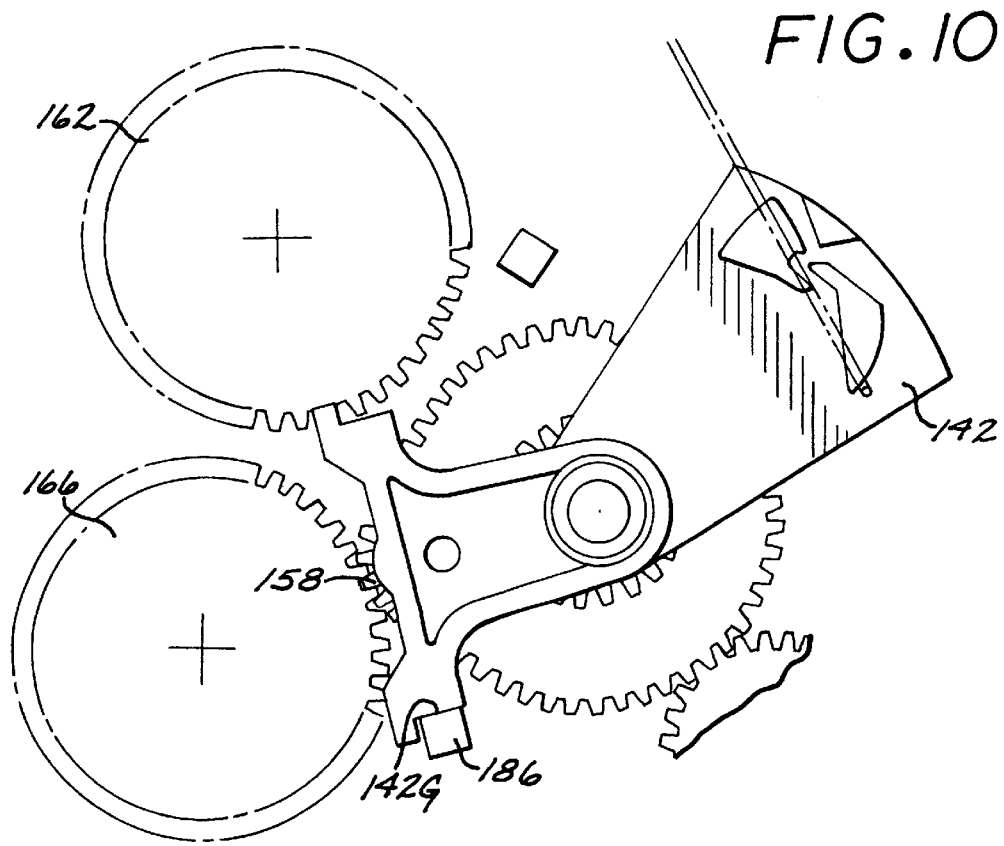
FIG. 10 is a view similar to FIG. 7, but showing the cam swing arm gear in engagement with the ASF drive gear.

FIG. 10 shows the case in which the motor 100 has been reversed a predetermined number of steps, starting with the shifting device 140 in the neutral position, to engage the ASF roller 42, i.e. so that the cam swing arm 142 is moved such that the spring follower 150 passes along the path from position 1 to position 2 to position 5 (FIG. 6). Here the cam swing arm shoulder surface 142G has come into contact with hard stop 186 extending from the plate 170.

Figure 11B:
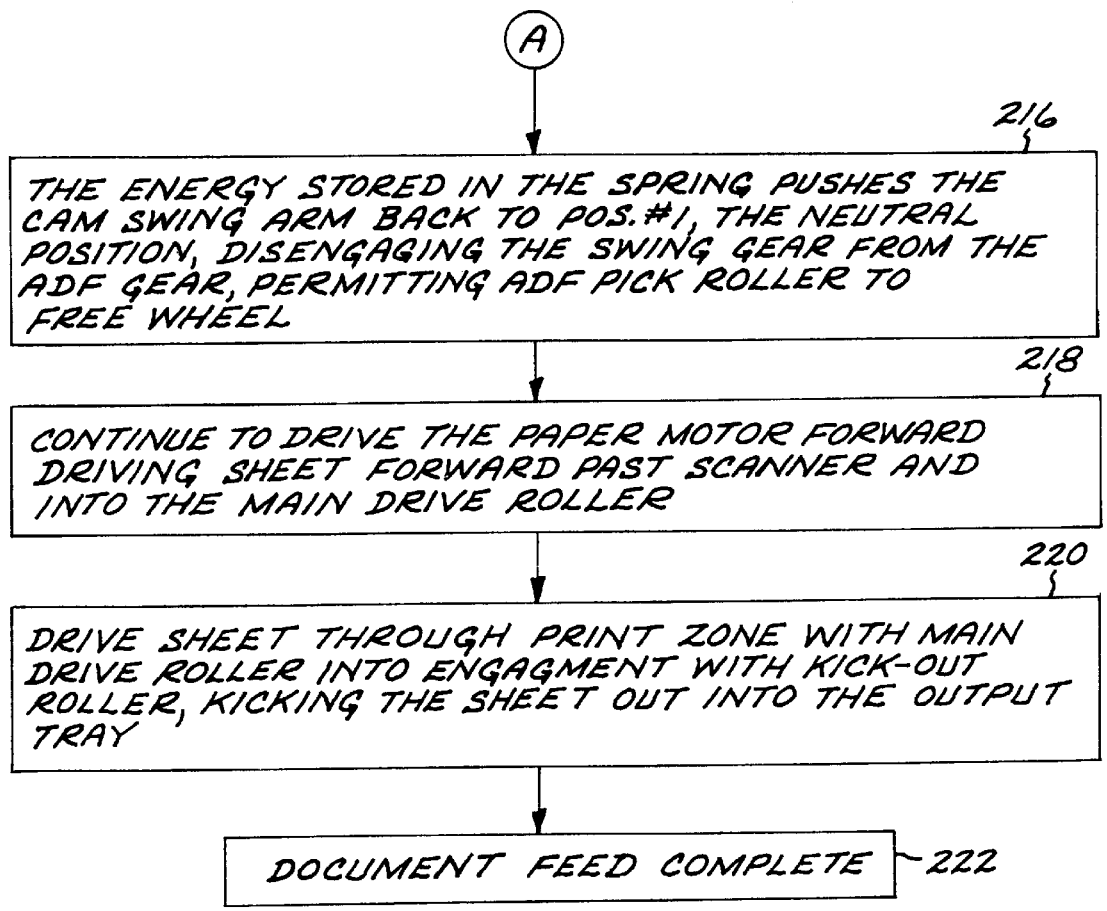

The operation of the apparatus 20 in an automatic document feed (ADF) mode 200 is further illustrated by the flow diagram of FIGS. 11A–11B. The ADF mode is initiated at step 202, e.g. by the user actuation of a panel control switch or by a host computer command. The ADF mode starts (204) with the cam swing arm 142 in the neutral position 1 (FIG. 6). The motor 100 is driven in the reverse direction a predetermined number of motor steps, moving the cam swing arm to position 2 (step 206). Next, the motor is driven forward, rotating the cam swing arm 142 to position 3, causing the swing gear 158 to engage with the ADF gear 162 (step 208). The motor continues to drive in the forward direction, rotating the ADF drive roller 32 in the forward direction, separating the lowermost sheet of the document stack in the ADF station, and advancing the picked sheet toward the pre-scan roller 50 (step 210). The motor drives in the forward direction, presenting the leading edge of the picked sheet to the nip between the pre-scan roller 50 and the idler roller 52, actuating the media sensor (step 212).

As the motor 100 continue to drive in the forward direction, with the leading edge engaged in the nip, the pre-scan roller 50 takes over the drive of the picked sheet at a faster speed than the ADF roller 32. This is due to the selection of gear sizes for the gear train and the roller diameters. This effect overdrives the ADF gear 162, so that the gear 162 drives the swing gear 158, instead of the gear 158 driving the ADF gear 162. This drive on the swing gear imparts a moment on the cam swing arm 142, rotating the arm 142 to position 4 (FIG. 6). The movement of the arm to position 4 from position 3 causes the follower 150 to move around the island 142C, storing energy in the spring follower (step 214).

The energy stored in the spring follower 150 as a result of the movement from position 3 to position 4 pushes the cam swing arm back to position 1 (neutral) from position 4, by the shape of the cam surface between position 4 and position 1, disengaging the swing gear 158 from the ADF gear 162, permitting the ADF roller to freewheel (step 216).

The motor 100 is driven forward, driving the picked sheet forward past the scanner station, with the leading edge entering the nip between the main drive roller and the idler roller (step 218). Now the sheet is driven through the print zone with the main drive roller, driving the leading edge into engagement with the nip between the kick-out roller and the idler roller, which kicks the picked sheet out into the output tray (step 220), completing the ADF mode (222).

Figure 12:
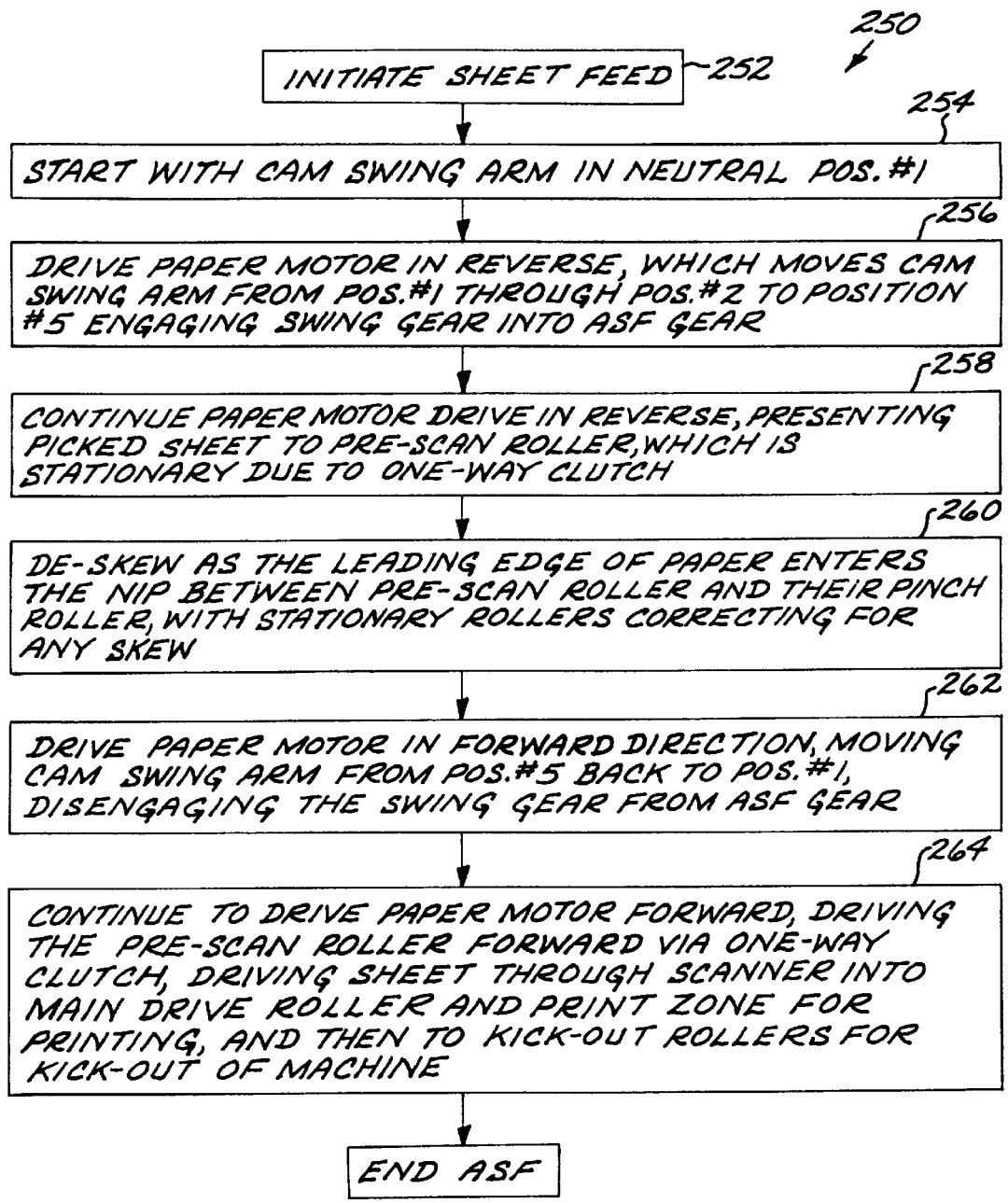
FIG. 12 is a flow diagram illustrating the operation of the office equipment of FIG. 1 during an automatic sheet feed operation.

FIG. 12 is a flow diagram of an exemplary ASF mode 250. The ASF mode is initiated (252), e.g. by the user actuating a switch on the control panel of the office equipment, or by a command from a host computer. The ASF mode commences at 254 with the cam swing arm 142 in the neutral position 1 (FIG. 6). The motor 100 is driven in reverse at 256, moving the cam swing arm 142 from position 1 through position 2 to position 5, thereby engaging the swing gear 158 with the ASF gear 166 and driving the ASF roller 42. This picks the top sheet from the stack at the ASF station 40.

At 258, the motor continues to be driven in reverse, presenting the picked sheet to the pre-scan roller, which is stationary due to the one-way clutch which delivers drive force to pre-scan roller only when the motor is driven in the forward direction. To address possible problems resulting from the sheet being misaligned or skewed with the feed path, a de-skew operation is conducted (260). As the leading edge reaches the nip between the stationary pre-scan rollers and the corresponding pinch rollers, any skew will be corrected, since if the edge reaches one nip before the other, it will be held there until the edge also reaches the other nip, therefore aligning the leading edge with the two nips. After the motor has been driven in the reverse direction for a predetermined number of steps, or a predetermined time, the controller drives the motor in the forward direction (262). This drives the pre-scan rollers, driving the picked sheet forward to the scan station. The forward drive of the motor also moves the cam swing arm 142 from position 5 back to position 1, disengaging the ASF gear 166 and roller 42 from the drive, permitting the roller 42 to freewheel.

At 264, the motor continues to drive in the forward direction, driving the pre-scan rollers forward via the oneway clutch, driving the picked sheet through the scanner station into the nip between the main drive rollers and corresponding pinch rollers, through the print zone for printing, and then to the kick-out rollers for kick-out from the machine. The ASF mode then ends (266).

Figure 13:
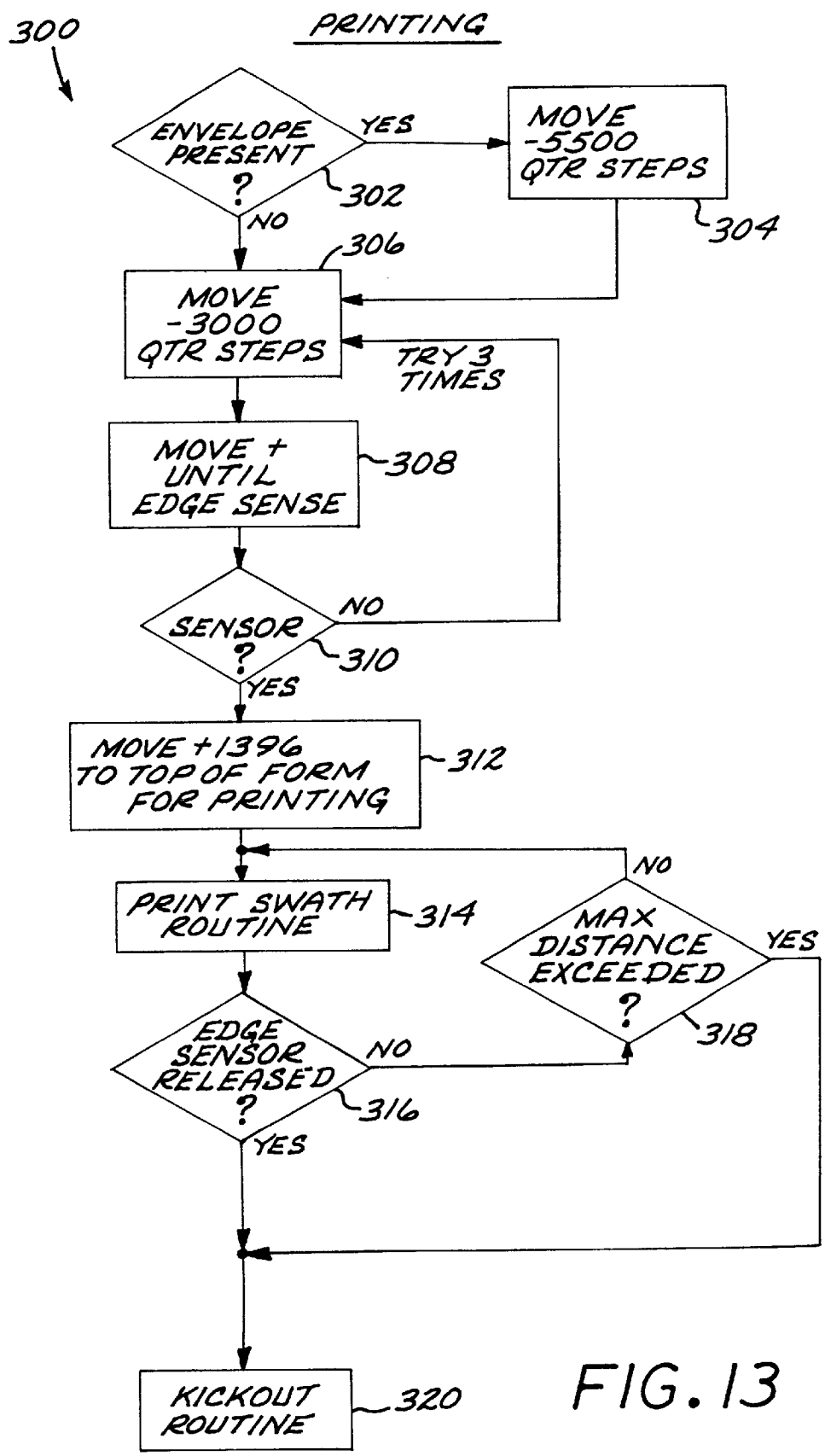
FIG. 13 is a simplified flow diagram of a printing function performed by the machine of FIG. 1, illustrating the motor control used to control the three-state switching device.
Figures 14, 15:
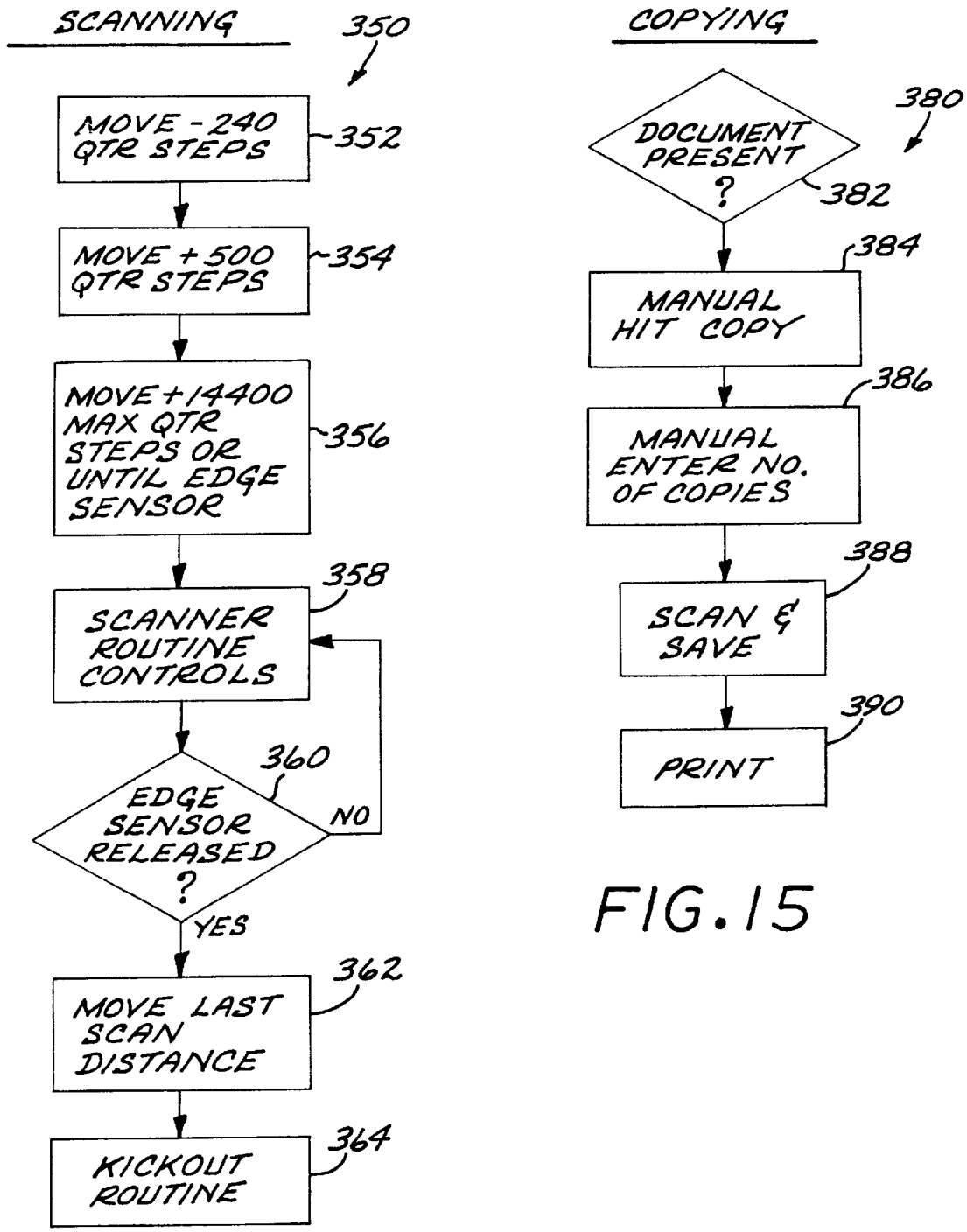
FIG. 14 is a simplified flow diagram of a scanning function performed by the machine of FIG. 1, illustrating the motor control used to control the three-state switching device.
FIG. 15 is a simplified flow diagram of a copying function performed by the machine of FIG. 1, using the printing and scanning functions shown in FIGS. 13 and 14.

FIGS. 13–15 illustrate exemplary specific controller sequences for the print, scan and copy functions performed by the machine 20. These sequences can be programmed into the controller memory, or implemented as firmware.

Referring to FIG. 13, an exemplary printing operation 300 is shown, which will use the ASF mode. At 302, a decision is made as to whether an envelope is present in the ASF tray. If so, then the controller commands the motor to move (at 304) a predetermined number of steps in the reverse direction, here −5500 quarter steps ("−" indicates reverse direction, "+" indicates forward direction). If an envelope is not present, the controller commands (306) the motor to move a predetermined number of steps in the reverse direction, say −3000 quarter steps. Of course, the particular number of steps is determined for each application; the particular number of steps set out in FIGS. 13 and 14 are merely exemplary. At 308, the controller commands the motor to move in the forward direction (+) by a given distance, say +100 steps, or until the leading edge of the picked sheet trips the edge sensor. At step 310, if the edge sensor has not been tripped, step 306 is repeated, up to three times. If the edge detect has not been tripped after three tries, the controller will conclude that a misfeed occurred. If the edge sensor has been tripped by the leading edge, at 312 the controller commands the motor to move a further predetermined number of steps in the forward direction, here +1396 quarter steps, advancing the picked form so that the top is position for printing at the printer station. A printer swath routine is invoked at 314 to print a swath on the form and advance the form by a swath distance. If the edge sensor is not released at 316 due to this advancement, i.e. by passage of the trailing edge past the sensor, another swath (314) is printed. Once the edge sensor is released, or the maximum distance (318) is exceeded, the print sequence is continued for a specific distance which does not exceed the distance to the trailing edge of the sheet minus the bottom margin, and a kick-out routine is performed to kick out the printed form to the output tray.

FIG. 14 shows a scan sequence 350, for performing an optical scanning function on a document at the ADF 30. At step 352, the controller commands the motor to move a predetermined number of steps in the reverse direction, here −240 quarter steps. At 354, the controller commands a move in the forward direction, +500 quarter steps. Now at 356, the controller commands the motor to move forward a maximum number of steps, say +14400 quarter steps, or until the edge sensor is tripped by the leading edge of the picked sheet. At 358, with the picked sheet in position at the scanner station, a scanner routine controls, until the controller senses the edge sensor has been released (360), indicating the trailing edge of the picked sheet has passed the sensor. Now at 362, the controller commands the motor to move a last predetermined scan distance, and the kick-out routine is performed at 364 to eject the scanned sheet.

FIG. 15 illustrates a copy function 380 performed by the machine 20, to copy a document in the ADF input tray. After a document is detected at 382, the user manually enters a command for the machine to perform the copy function (384), and enters the number of copies on a machine panel switch or input device (386). The machine then executes at 388 a scan function, more particularly shown in FIG. 14, saves the scanned data in memory. Next, at 390, the print operation is performed, as shown more particularly in FIG. 13.

It is understood that the above-described embodiments are merely illustrative of the possible specific embodiments which may represent principles of the present invention. Other arrangements may readily be devised in accordance with these principles by those skilled in the art without departing from the scope and spirit of the invention. For example, the invention can be employed with a device having separate media paths for documents and sheets, i.e. with a single motor and three-state shifting device to switch between ADF and ASF functions.

What is claimed is:

1. A multi-function sheet handling system, comprising:
    a first sheet feeder for feeding sheets of a document held in a first input source, the first sheet feeder including a first pick roller for selectively picking a sheet of the document and advancing the picked sheet along a first path;
    a second sheet feeder for feeding sheets of a print media held in a second input source, the second sheet feeder including a second pick roller for selectively picking a sheet from the second input source and advancing the picked sheet along a second path;
    a first gear for driving said first pick roller;
    a second gear for driving said second pick roller;
    a motor drive including a motor and a gear train;
    a three-state shifting device coupling the motor drive gear train to said first and said second gears, said shifting device having a neutral state wherein neither said first gear nor said second gear is driven, a first gear drive state wherein only said first gear is driven, and a second gear drive state wherein only said second gear is driven, said device including a cam swing arm having a plurality of cam surfaces, and a ratcheting cam follower, and wherein said shifting device is shifted from one state to another by operation of said motor in a sequence of reverse and/or forward motor drive operations and without the use of a solenoid to actively drive said cam swing arm.

2. The system of claim 1 wherein said three-state shifting device includes a swing gear mounted for rotation on said cam swing arm, an input gear mounted for rotation on said cam swing arm, said input gear in engagement with said swing gear and in engagement with said motor gear train so that said input gear is driven in either a forward or a reverse direction by said motor drive system, and in turn drives said cam swing gear.

3. The system of claim 2 further comprising a drag system induce a drag force tending to impart a rotational force on said cam swing arm in response to input drive on said input gear by said motor gear train.

4. The system of claim 3 wherein said drag system includes a drag clutch for imparting a frictional drag on said swing gear.

5. The system of claim 1 wherein said cam surfaces include a first cam island having a first circumferential surface path and a second cam island having a second circumferential path, and wherein said first and second paths include a common first state location at which said cam follower is disposed in said neutral state, said first path includes a second state position at which said cam follower is disposed when the shifting device is in said first gear drive state, and said second path includes a third state position at which said cam follower is disposed when the shifting device is in said second gear drive state.

6. The system of claim 5 wherein said cam follower circumnavigates about the first cam island during an first sheet feeder operation, and said cam follower circumnavigates about the second cam island during a second sheet feeder operation.

7. The system of claim 5 wherein said cam follower includes a spring element having a fixed first end and a second end which engages said cam surfaces and follows said first or second path during operation of said system, and wherein said spring element is deflected during a portion of travel about said first path, storing energy released during a subsequent portion of travel about said first path and causing said cam swing arm to return to said neutral position.

8. The system of claim 7 wherein said spring element has a first spring constant for resisting deflection in a first direction, and a second spring constant higher than the first spring constant for resisting deflection in a second direction.

9. The system of claim 1 further including a first drive roller and first pinch roller which meet to define a first nip, said drive roller being driven by a first drive gear comprising said motor gear train;

and wherein said first path and said second path lead to said nip so that a sheet picked from said first input source or from said second input source is fed into said first nip.

10. The system of claim 9 further comprising a controller for controlling said motor to thereby control said three-state shifting device, wherein the controller is adapted to execute a first sheet feeder mode to drive the motor in a first sequence of reverse motor operation and subsequent forward motor operation to cause the shifting device to engage the swing gear with the first gear, and the controller is further adapted to execute a second sheet feeder mode to drive the motor in a second sequence of reverse motor operation and cause the shifting device to engage the swing gear with the second gear.

11. The system of claim 10 wherein sizes of said first roller, said first gear, said first drive roller and said first drive gear are such that said first drive roller drives a picked sheet at a faster rate than a rate at which said first roller drives said picked sheet, and wherein engagement of a picked sheet during the first sheet feeder mode in said first nip results in said first roller being overdriven and thereby imparting a force to said cam swing arm, rotating said arm such that swing gear moves out of engagement with said first gear.

12. The system of claim 10 wherein said motor is a stepper motor, and said controller is adapted to drive the motor in a reverse direction to initiate the second sheet feeder mode, said reverse motor drive causing said cam swing arm to move to a position wherein said swing gear engages said second gear to drive said second pick roller, thereby picking a sheet from said second input source and driving said picked sheet toward said first nip, and wherein said controller is adapted to change the motor drive from the reverse direction to the forward direction, driving the first drive roller and the picked sheet, and causing the cam swing arm to rotate such that the swing gear moves out of engagement with the second gear and the cam swing arm moves to the neutral state.

13. The system of claim 1 further including a scanner station, and wherein the first sheet feeder is a document feeder for feeding sheets of a document to be passed through the scanner station for an optical scanning operation.

14. The system of claim 1 further including a printing station, and wherein the second sheet feeder is a sheet feeder for feeding blank sheets to be passed through the printer station for a printing operation.

15. The system of claim 1, wherein said three state shifting device further includes a transparent acceptance window in a cover structure, and wherein a keeper end of the cam follower is secured to said cover structure, said transparent acceptance window permitting visual inspection of said follower to determine that the follower end of said cam follower is in an acceptable position when said three state shifting device is in said neutral state.

16. A method for handling sheets in a multi-function sheet handling system, comprising the steps of:

providing a first supply of sheets in a first input source;

providing a first pick roller for selectively picking a sheet in the first input supply and advancing the picked sheet along a first path;

providing a second supply of sheets in a second input source;

providing a second pick roller for selectively picking a sheet from the second input source and advancing the picked sheet along a second path;

providing a first gear for driving said first pick roller, a second gear for driving said second pick roller, and a motor drive including a motor and a gear train;

providing a three-state shifting device coupling the motor drive gear train to said first and said second gears, said shifting device having a neutral state wherein neither said first gear nor said second gear is driven, a first gear drive state wherein only said first gear is driven, and a second gear drive state wherein only said second gear is driven, said device including a cam swing arm having a plurality of cam surfaces, and a ratcheting cam follower;

operating said motor in a sequence of reverse and/or forward motor drive operations to shift the shifting device from one state to another and without the use of a solenoid to actively drive said cam swing arm.

17. The method of claim 16 wherein said three-state shifting device includes a swing gear mounted for rotation on said cam swing arm, an input gear mounted for rotation on said cam swing arm, said input gear in engagement with said swing gear and in engagement with said motor gear train, and wherein said step of operating said motor includes the step of driving said input gear in either a forward or a reverse direction by said motor drive system, in turn driving said cam swing gear.

18. The method of claim 16 further comprising the step of applying a drag force tending to impart a rotational force on said cam swing arm in response to input drive on said input gear during said step of operating said motor.

19. The method of claim 16 wherein said cam surfaces include a first cam island having a first circumferential surface path and a second cam island having a second circumferential path, and further comprising the step of circumnavigating said first island with said cam follower during a first sheet feeder operation, and circumnavigating said second cam island with said cam follower during a second sheet feeder operation.

20. The method of claim 19 wherein said cam follower includes a spring element having a fixed first end and a second end which engages said cam surfaces and follows said first or second path during operation of said system, and further comprising the step of deflecting said spring element during said step of operating said motor during a portion of travel about said first path, storing energy released during a subsequent portion of travel about said first path and causing said cam swing arm to return to said neutral position.

21. The method of claim 16 wherein said step of controlling said motor includes the following steps:

executing a first sheet feeder mode to drive the motor in a first sequence of reverse motor operation and subsequent forward motor operation to cause the shifting device to engage the swing gear with the first gear; and executing a second sheet feeder mode to drive the motor in a second sequence of reverse motor operation and cause the shifting device to engage the swing gear with the second gear.

* * * * *